G. TAYLOR.
REGULATING VALVE.
APPLICATION FILED JUNE 4, 1909.
993,806.
Patented May 30, 1911.
2 SHEETS—SHEET 1.
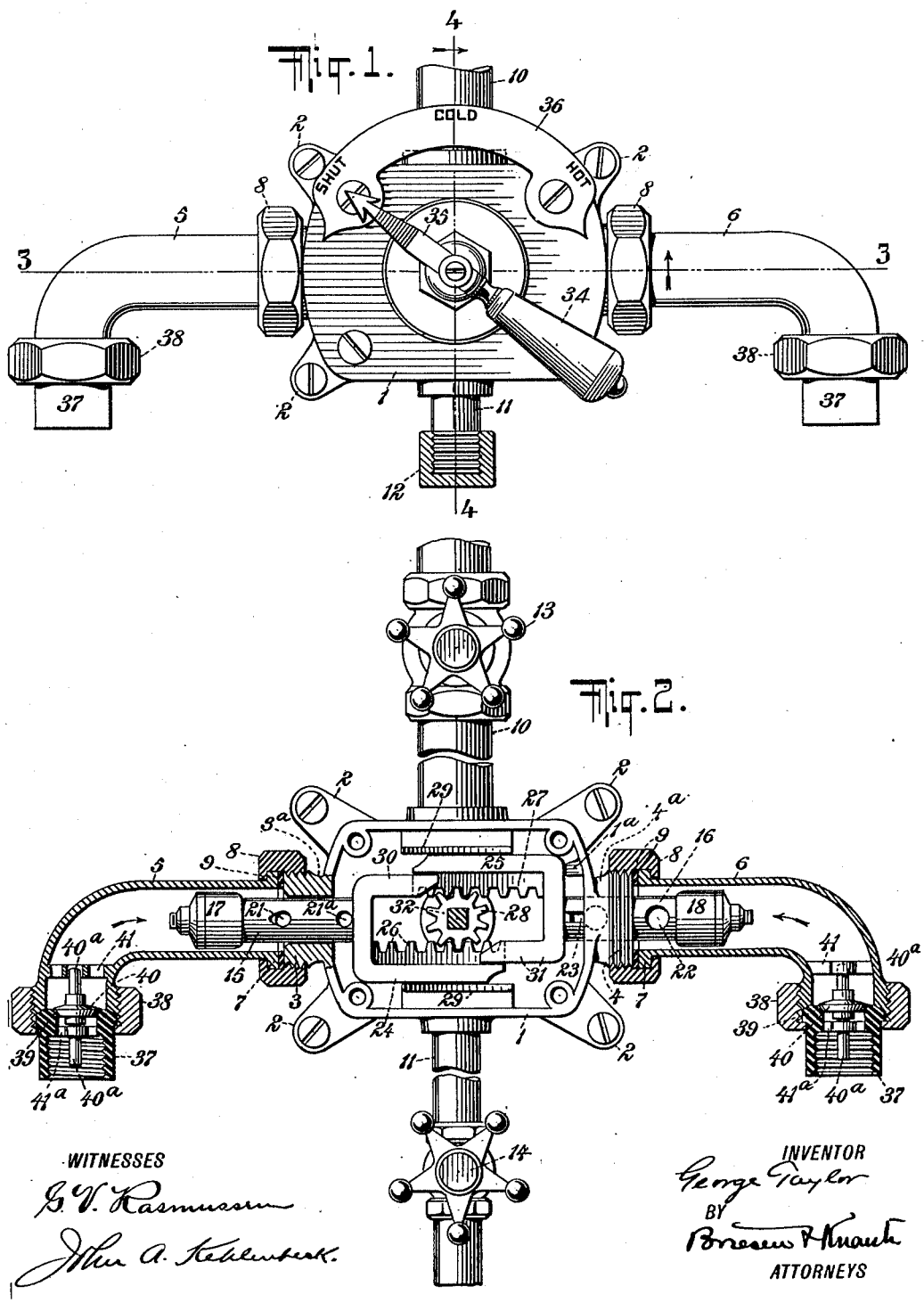

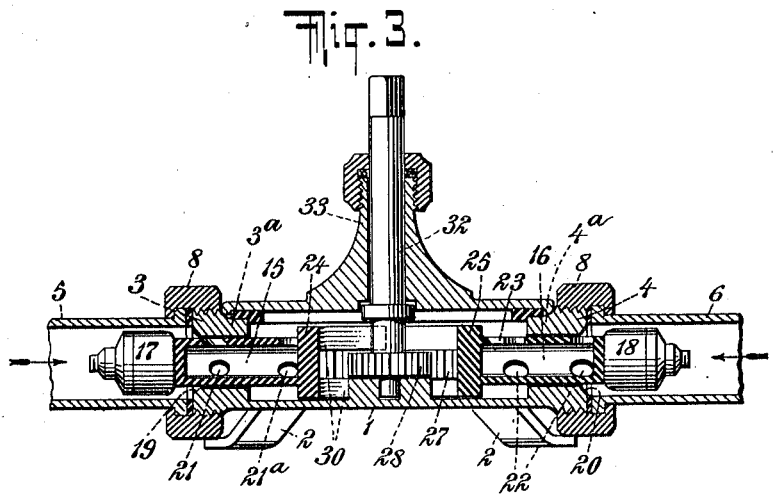
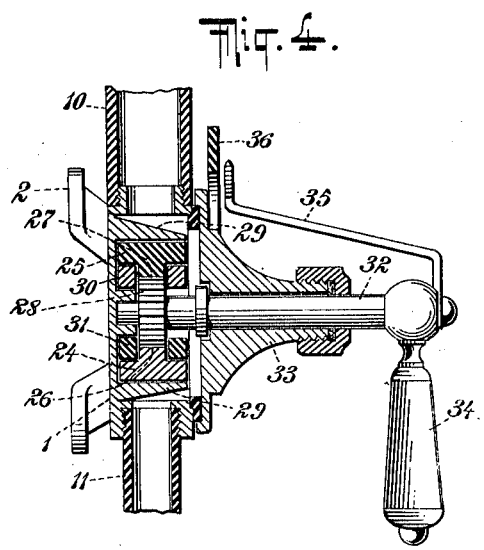
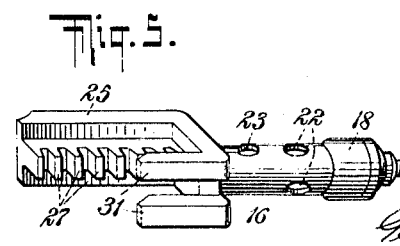

UNITED STATES PATENT OFFICE.

GEORGE TAYLOR, OF JERSEY CITY, NEW JERSEY.

REGULATING-VALVE.

993,806.

Specification of Letters Patent.

Patented May 30, 1911.

Application filed June 4, 1909. Serial No. 500,051.

*To all whom it may concern:*

Be it known that I, GEORGE TAYLOR, a citizen of the United States, and resident of Jersey City, county of Hudson, and State of New Jersey, have invented a certain new and useful Improvement in Regulating-Valves, of which the following is a specification.

My invention relates to safety valves employed in connection with fixtures for distributing water and regulating the temperature thereof for bathing and other purposes.

The object of my invention is to produce a valve of this character by the use of which water of any predetermined or desired temperature may be discharged from the orifice adapted for this purpose, whether in the form of spray or a stream.

The further object of my invention consists in providing means whereby it becomes impossible to obtain from the orifice a discharge of water of a degree of heat equal to that contained in the hot water supply pipe; by this mechanism, I prevent all possibility of scalding.

My invention is illustrated in the drawings in which—

Figure 1 is an elevation of my improved valve. Fig. 2 is a similar view illustrating the interior parts of the device shown in Fig. 1. Fig. 3 is a section on the line 3—3 of Fig. 1. Fig. 4 is a section on the line 4—4 of Fig. 1, and Fig. 5 illustrates the rack and connections with the cold water supply.

The device comprises a casing or chamber 1 provided with brackets 2 for securing it in position and further having externally screw-threaded couplings or unions 3 and 4 located at opposite sides of said casing in axial alinement with each other. Inlet or supply connections 5 and 6 are detachable parts of the unions 3 and 4 coupling nuts 8 being provided for securing said connections 5 and 6 to said unions 3 and 4. The connection 5 is connected with a source of hot water while the connection 6 is connected with the cold water supply. A pipe 10 is also secured to said casing and communicates with the interior thereof through an opening in the upper wall, the free end of said pipe being in communication with a shower bath or similar device. A similar pipe 11 extends from the lower wall of said casing 1 and may if desired be connected with a shampooing spray or other device and if not used may be closed by a cap 12 as indicated in Fig. 1.

Valves 13 and 14 are located respectively in the pipes 10 and 11 for controlling the flow of the water therethrough.

Hollow stems 15 and 16 extend through the necks of the couplings 3 and 4 into the connections 5 and 6, said stems fitting snugly to form a water tight joint yet being capable of a sliding movement. Each stem is provided with an annular projection or valve 17, 18 adapted for engagement with a seat 19, 20 on each of the unions 3 and 4 to completely shut off the supply of water from the interior of the casing 1.

A number of spaced openings 21 and 21$^a$ are formed in the stem 15 and similar openings 22 are located in the stem 16, which in addition is provided with an elongated aperture 23 the purpose of which will be more fully described hereinafter. Each stem 15 and 16 is further connected with a yoke 24, 25 on which are formed teeth 26 and 27 in the shape of a rack, each adapted to mesh with a pinion 28. The yokes 24 and 25 are slidably mounted between guides 29 forming part of or secured to the interior of the casing 1 and further are provided with spaced fingers 30, 31 which project on each side of the respective racks 26, 27 and serve as additional means for maintaining said racks in proper relation to each other. The pinion 28 is secured on a stem 32 rotatably mounted in a stuffing box 33 forming part of the casing 1 and provided at its free end with an operating handle 34. An indicating arrow 35 is also secured to said stem 32 the free or pointed end of which arrow moves adjacent to a plate 36 secured in proper position on the casing 1. Indications such as "Hot," "Cold" and "Shut" to indicate the position of the valve are produced on this plate as clearly shown in Fig. 1. A stop 1$^a$ is located in the casing 1 at a point where it may be engaged by the yoke 25 to limit the movement thereof in one direction.

Internally screw threaded sleeves 37 are arranged to be secured adjacent to the free ends of the connections 5 and 6 in axial alinement therewith by means of coupling nuts 38 which engage the screw-threaded free ends of said connections 5 and 6. These sleeves are provided with seats 39 adapted to be engaged by check valves 40, carried by stems 40$^a$ extending through spiders or guides 41, 41$^a$ located respectively in the connections 5 and 6 and the sleeves 37. The front of the casing is preferably made removable so as to permit access to the interior of said casing for any purpose, it being understood that the said removable front is fastened in such a manner as to make the casing absolutely water tight.

When the valve is in its closed position and the water is completely shut off the handle 34 and the indicating arrow 35 are in the position shown in Fig. 1. In this position the interior mechanism is in the opposite position to that illustrated in Fig. 2, or in other words the valves 17 and 18 are in engagement respectively with the seats 19 and 20. If the handle 34 is now swung to the left in Fig. 1 to a point where the indicating arrow registers with the indication "Cold" on the plate 36 the pinion 28 will have been rotated correspondingly and the yokes 24 and 25 will through the medium of the teeth 26 and 27 have been moved a certain distance to the right and left respectively or in other words away from each other. In this position the valves 17 and 18 have been moved away from their respective seats 19 and 20 and the openings 22 in the stem 16 have been moved out of the collar 4ª, while the opening 23 of said stem 16 has not yet been moved into the said collar 4. At the same time the stem 15 has been correspondingly moved without however exposing any of the openings 21 which in other words still remain in the collar 3ª, it being understood that the openings 21 of the stem 15 and the openings 22 and 23 of the stem 16 are so placed on each stem relatively to the other that this is possible. Thus cold water will flow from the connection 6 through the openings 22 to the interior of the stem 16 and out through the opening 23 to the casing 1 and from there either through the pipe 10 to the shower or through the pipe 11 to the shampoo spray according to which valve 13 or 14 is open or closed. With the parts in this position only cold water will be delivered at the outlet, that is the shower or the shampoo spray as the case may be. If the handle 32 is now moved farther to the left the yokes 24 and 25 will be gradually separated by means of the pinion 28 and the stems 15 and 16 will be correspondingly moved. As this movement takes place the opening 23 of the stem 16 will gradually be moved into the collar 4ª so that its operative area is decreased and the supply of cold water thus diminished while at the same time the openings 21 of the stem 15 will be gradually moved out of the collar 3ª so as to admit hot water to the interior of the casing. This hot water passes from the connection 5 through the openings 21 into the stem 15 and out through the openings 21ª which are so located on the stem 15 as to always be free from the collar 3ª. Thus hot and cold water becomes mixed in the casing 1 and is delivered in this mixed condition through either the pipe 10 or 11. As the movement of the handle 34 continues, the yokes 24 and 25 will continue to be separated until finally the yoke 25 abuts against the stop 1ª. In this position of the parts the indicating arrow 35 is at the point marked "Hot" on the plate 36 and the openings 21 are fully removed from the collar 3ª. During this final movement of the parts the opening 23 has been gradually moved into the collar 4ª so that the supply of cold water has been decreased while the supply of hot water has increased and the temperature of the water delivered either at the shower or the shampoo spray correspondingly raised.

In the extreme position of the parts as illustrated in Fig. 2 a portion of the opening 23 is still exposed so that some cold water flows through said exposed portion of said opening 23 into the casing 1 where it mixes with the hot water and prevents scalding by reducing the temperature thereof. The stop 1ª serves to limit the expanding movement of the yokes 24 and 25 so that it is impossible to entirely shut off the supply of cold water when the valve is open and in use. This is very important as if the handle were at once moved to the extreme hot position and only hot water delivered the temperature of said water might be so high as to painfully burn and scald the user. Such a contingency is absolutely impossible with my device as some cold water will be delivered to the interior of the casing 1 to mix with the hot water at all times while the valve is in use. By gradually moving the handle 32 in either direction water at the temperature desired may be easily secured. To shut off the supply the handle 32 is moved to the extreme right in Fig. 1 so as to return the valves 17 and 18 to their respective seats 19 and 20 and the openings 21 and 22 of the stems 15 and 16 within the collars 3ª and 4ª.

The check valves 40 prevent the water from one pipe from forcing the water in the other pipe back therein. In other words should the pressure of the hot water be greater than that of the cold water, the valve 40 in the connection 6 will be closed and will prevent said hot water from being forced beyond this point and vice versa if the pressure of the cold water is greater than that of the hot water.

Thus with my valve by simply operating a single handle either cold water, or substantially entirely hot water or a mixture of both may be obtained.

With my invention cold water may be delivered at its normal temperature, or tepid water may be secured if desired, and hot water may be received at or below the boiling point and delivered at any desired temperature up to the safety limit without the possibility of scalding. The gradual increase or decrease from hot to cold or vice versa is entirely within the control of the user through the medium of a single operating handle.

Various modifications may be made without departing from the spirit of my invention as defined in the claims.

I claim as my invention:

1. The combination of a casing having an outlet and further having oppositely disposed inlets, valves controlling said inlets, hollow stems on which said valves are carried provided with spaced openings, and means for moving said stems and positively connected therewith to operate the valves and to first bring the openings in one stem to an operative position and then to bring the openings of the second stem to an operative position.

2. The combination of a casing having an outlet and further having oppositely disposed inlets for hot and cold water, valves movable toward and from each other for adjustably controlling the flow of hot and cold water, racks to which said valves are secured and guided on each other, a single pinion meshing with both of said racks and a handle for rotating said pinion to operate said racks and valves.

3. The combination of a casing having an outlet and further having oppositely disposed inlets for hot and cold water, valves movable toward and from each other for controlling the flow of hot and cold water, racks guided on each other to which said valves are secured, a single pinion meshing with both of said racks, a handle for rotating said pinion to operate said racks and valves, and an indicator for disclosing the position of the valves.

4. The combination of a casing having two inlets and an outlet, valves controlling the passage of fluid from the respective inlets to the outlet, racks connected with said valves and movable relatively to each other, guides connected with each rack to move therewith and engaging the other rack for guiding said racks and a single toothed operating device in engagement with both of the racks.

5. The combination of a casing having an outlet and two inlets respectively for hot and cold water, valves controlling said inlets, hollow stems on which said valves are carried provided with spaced openings for establishing communication with the casing, one of the openings of the cold water valve stem being so located as to always communicate with the casing when the valves are open, and means for moving said stems to operate said valves.

6. The combination of a casing having an outlet and two inlets respectively for hot and cold water, valves controlling said inlets, hollow stems on which said valves are carried provided with spaced openings for establishing communication with the casing, means for moving said stems to operate said valves and a stop for limiting the movement of said stems so that one of the openings of the cold water valve stem will always be in communication with the casing when the valves are open.

In testimony whereof I have hereunto set my hand in the presence of two subscribing witnesses.

GEORGE TAYLOR.

Witnesses:
JOHN A. KEHLENBECK,
JOHN LOTKA.